United States Patent
Wang et al.

(10) Patent No.: US 9,917,380 B2
(45) Date of Patent: Mar. 13, 2018

(54) MULTIPURPOSE WIRE CONNECTION DEVICE

(71) Applicants: State Grid Corporation of China, Beijing (CN); State Grid Shanxi Electric Power Corporation Yuncheng Power, Yuncheng (CN); Shanxi Zhongzhou Electric Co., Ltd, Shanxi (CN)

(72) Inventors: Xiangyun Wang, Yuncheng (CN); Le Wang, Yuncheng (CN); Zao Wang, Yuncheng (CN); Jun Yang, Yuncheng (CN); Tian Zheng, Yuncheng (CN)

(73) Assignees: State Grid Corporation of China, Beijing (CN); State Grid Shanxi Power Corporation Yuncheng Power, Yuncheng (CN); Shanxi Zhongzhou Electric Co., LTd, Shanxi (CN)

( * ) Notice: Subject to any disclaimer, the term of this patent is extended or adjusted under 35 U.S.C. 154(b) by 0 days.

(21) Appl. No.: 15/514,732

(22) PCT Filed: Jan. 21, 2016

(86) PCT No.: PCT/CN2016/071585
§ 371 (c)(1),
(2) Date: Mar. 27, 2017

(87) PCT Pub. No.: WO2016/155408
PCT Pub. Date: Oct. 6, 2016

(65) Prior Publication Data
US 2018/0013213 A1    Jan. 11, 2018

(30) Foreign Application Priority Data

Mar. 30, 2015 (CN) .......................... 2015 1 0143054

(51) Int. Cl.
*H01R 13/52* (2006.01)
*H01R 9/24* (2006.01)
(Continued)

(52) U.S. Cl.
CPC ............... *H01R 4/70* (2013.01); *H01R 4/305* (2013.01)

(58) Field of Classification Search
CPC ........... H01R 13/52; H01R 9/24; H01R 9/223
(Continued)

(56) References Cited

U.S. PATENT DOCUMENTS 4,050,770 A * 9/1977 Rigo ........................ H01R 9/24
174/59
5,649,841 A * 7/1997 Martinez ............. B60R 16/0239
439/34

(Continued)

FOREIGN PATENT DOCUMENTS

CN          1578034 A       2/2005
CN       200976477 Y       11/2007
(Continued)

OTHER PUBLICATIONS

International Search Report and Written Opinion for PCT/CN2016/071585 dated Apr. 22, 2016 (10 pages).

*Primary Examiner* — Gary Paumen
(74) *Attorney, Agent, or Firm* — Gardere Wynne Sewell LLP; Andre M. Szuwalski

(57) ABSTRACT

A multipurpose wire connection device includes a base plate, a conductive plate, a wire fixation screw, a fireproof box, a support, and a dustpan-shaped housing. The support is disposed on the base plate. The fireproof box includes a rear panel, a bottom panel, two side panels, and an inserted plate. The wire fixation screw is mounted on the conductive plate. The housing is fixed on the bottom plate by a housing fixing screw. The multipurpose wire connection device prevents sparking and red burning of a ground screw when lightning current passes therein, due to corroded contact in long-term exposure to wind and rain. It avoids fire and explosion accidents. It avoids screw corrosion and facilitates ground resistance measurement. The multipurpose wire connection device can also be used for electrical relay, division, (Continued)

and branching. It prevents fire, explosion, rain intrusion, and rust development. It is easy to disassemble.

14 Claims, 2 Drawing Sheets

(51) Int. Cl.
*H01R 4/70* (2006.01)
*H01R 4/30* (2006.01)

(58) Field of Classification Search
USPC ............... 439/901, 709, 718, 721, 723, 724
See application file for complete search history.

(56) References Cited

U.S. PATENT DOCUMENTS

| | | | | |
|---|---|---|---|---|
| 5,837,933 | A * | 11/1998 | Fligelman | B63H 21/22 174/50 |
| 7,121,847 | B1 * | 10/2006 | Jetton | H01R 13/527 439/723 |
| 7,432,439 | B2 * | 10/2008 | Takada | H01R 9/2425 174/50 |
| 2003/0036305 | A1 * | 2/2003 | Noguchi | H01B 3/445 439/502 |
| 2006/0196534 | A1 * | 9/2006 | Takada | H01R 9/2425 136/244 |
| 2010/0279550 | A1 * | 11/2010 | Rulken | C08G 69/265 439/625 |
| 2011/0273249 | A1 * | 11/2011 | Wan | H01H 71/04 335/11 |
| 2013/0146118 | A1 * | 6/2013 | Kelley | H05K 5/02 136/244 |

FOREIGN PATENT DOCUMENTS

| | | |
|---|---|---|
| CN | 201113325 Y | 9/2008 |
| CN | 104810629 A | 7/2015 |
| CN | 204614966 U | 9/2015 |

* cited by examiner

MULTIPURPOSE WIRE CONNECTION DEVICE

PRIORITY CLAIM

This application is a 371 filing from PCT/CN2015/071243 filed Jan. 21, 2016, which claims priority from Chinese Application for Patent Application No. 201510143054.8 filed Mar. 30, 2015, the disclosures of which are hereby incorporated by reference.

TECHNICAL FIELD

This invention relates to a kind wire connection device, in particular, a type of fireproof, explosion-proof, rain-proof, rustproof, and dissemble-ready multipurpose wire connection device.

TECHNICAL BACKGROUND

In petroleum and chemical industries, requirement is very high for fireproof, explosion-proof for manufacturing and storage facilities. Presently grounding connections are provided by bare screw connections. If such bare screw connections are exposed to rain, rust may cause disconnection. When the electrical current fluctuates due to thunder, arcing or shortage may also occur, causing fire or explosion accidents. On the other hand, if rusting causes a lightning rod to be disconnected, disasters could happen were the facility protected by the lightning rod struck by a lightning. In other instances, rusted screws may impede regular maintenance testing of the electrical connection, causing significant inconvenience.

SUMMARY

This invention aims to overcome the shortcomings of current technology to provide type of fireproof, explosion-proof, rain-proof, rustproof, and dissemble-ready multipurpose wire connection device.

In order to achieve the goals identified above, a multipurpose wire connection device includes a base plate (1), a conductive plate (3), a wire fixation screw (5), a fireproof box (6), a support (11), and a housing (9). The device includes the following features. The base plate (1) includes fixation holes (2), and support (11) and base plate washers (14). The base plate (1) has folded peripheries. The fireproof box (6) includes a piece of back plate, a bottom plate, two side plates, and an inserted plate (12). The fireproof box (6) is a box with an open top. The back plate includes fixation holes for the fireproof box. Fixation screws (4) are used to affix the fireproof box (6) to the support (11). The side plates include receiving grooves (13) for receiving the inserted plate (12). The conductive plate (3) includes holes for wire fixation screws and holes for affixing the conductive plate. The conductive plate (3) includes wire fixation screws (5), conductive plate fixation screws (7) affixing the conductive plate (3) to the shield plate (10). The housing (9) has a shape of a dustpan. The housing (9) uses fixation screws (8) to attach onto the base plate (1).

The multipurpose wire connection device based on the above description, further includes this feature: there is one or more of the wire fixation screw (5).

The multipurpose wire connection device based on the above description, further includes this feature: there is one or more of the fire proof box (6), conductive plate (3), and support (11).

The method of use includes: first, affixing the base plate (1) onto a wall (16) of a piece or equipment or a building structure, and inserting a conductive wire (17) from below and behind the fireproof box (6). Then the conductive wire is bent down from the conductive plate (3) and the wire fixation screw (5) affixes the conductive wire onto the conductive plate. The insert plate (12) is then inserted into the receiving grooves (13). The fireproof box becomes a box with an open top. Fireproof materials are then deposited into the fireproof box. The housing (9) then covers the assembly and is secured with screws (8). If the fireproof box is made with nonconductive materials, the wire connection device may also be used, besides grounding, electrical connection relay or division, with rain-proof and explosion-proof abilities.

BRIEF DESCRIPTION OF THE ATTACHED DRAWINGS

The disclosure will be better understood on reading the description which follows, given solely by way of example and with reference to the appended drawings in which.

FIGURE REFERENCE NUMERALS

1. Base plate;
2. Base plate fixation hole;
3. Conductive plate;
4. Fireproof box fixation screw(s);
5. Wire fixation screws;
6. Fireproof box;
7. Conductive plate fixation screw(s);
8. Screw(s);
9. Housing;
10. Shield plate;
11. Support;
12. Insert plate;
13. Receiving groove;
14. Base plate washer;
15. Base plate fixation screw(s);
16. Wall of a building;
17. Conductive wire;
18. Fireproof material;

DETAILED DESCRIPTION

Embodiment 1

Figure 1:
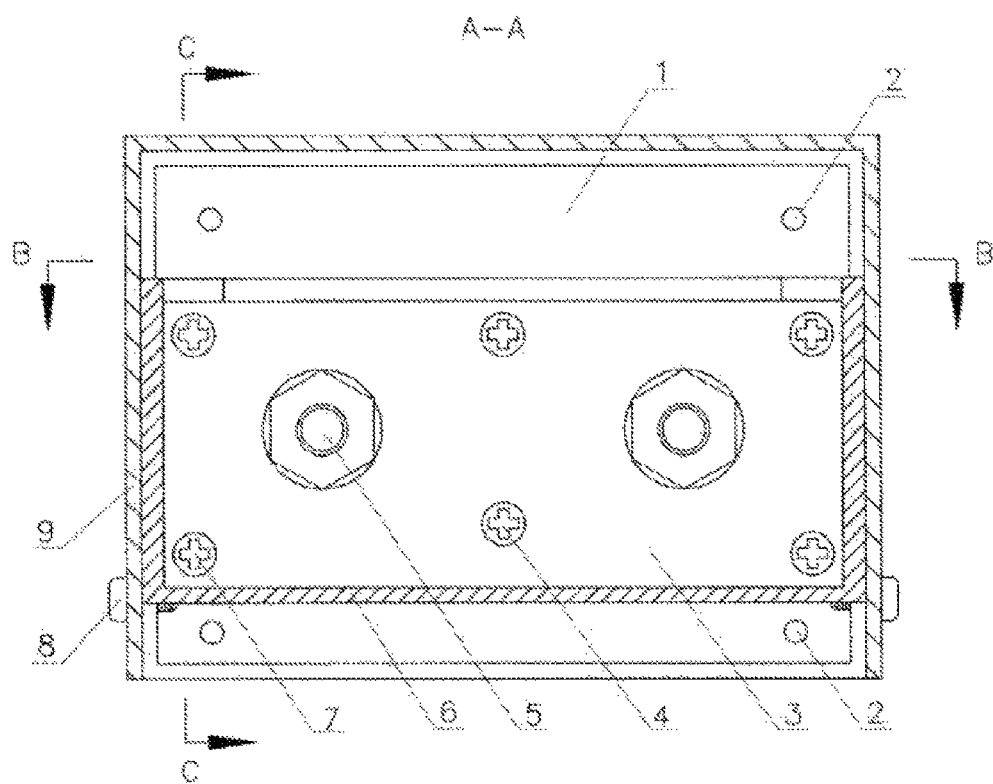
FIG. 1 is the cross sectional view at A-A of one embodiment of the multipurpose wire connection device.
Figure 2:
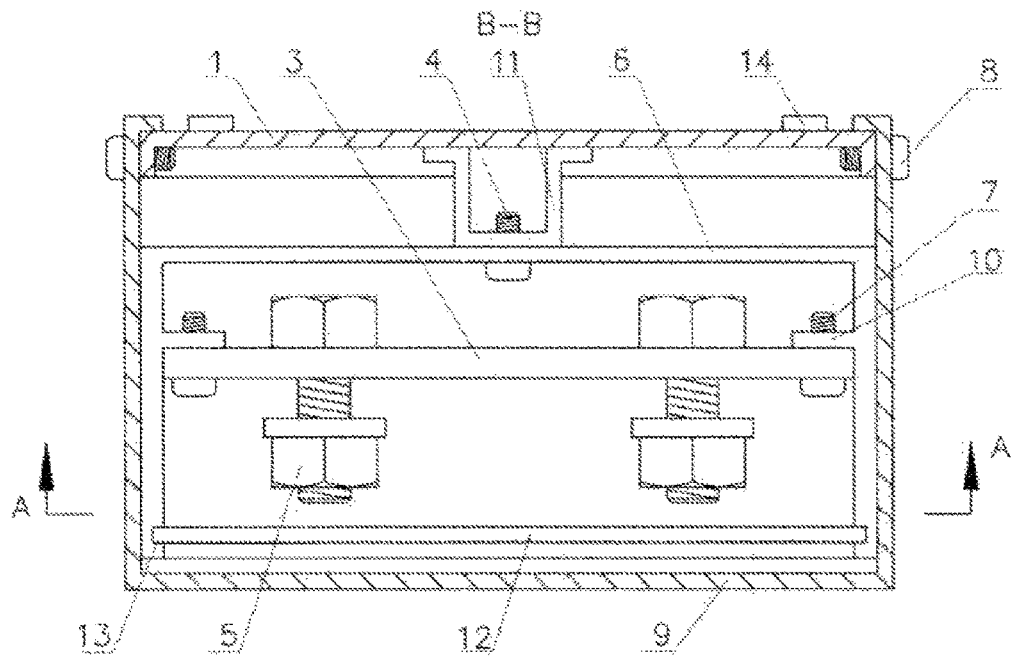
FIG. 2 is the cross sectional view at B-B of one embodiment of the multipurpose wire connection device.
Figure 3:
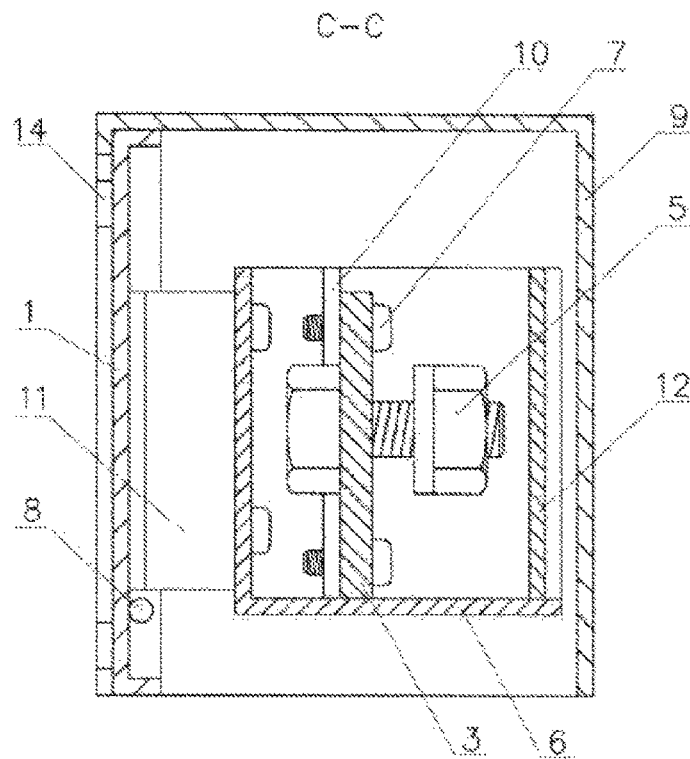
FIG. 3 is the cross sectional view at C-C of one embodiment of the multipurpose wire connection device.
Figure 4:
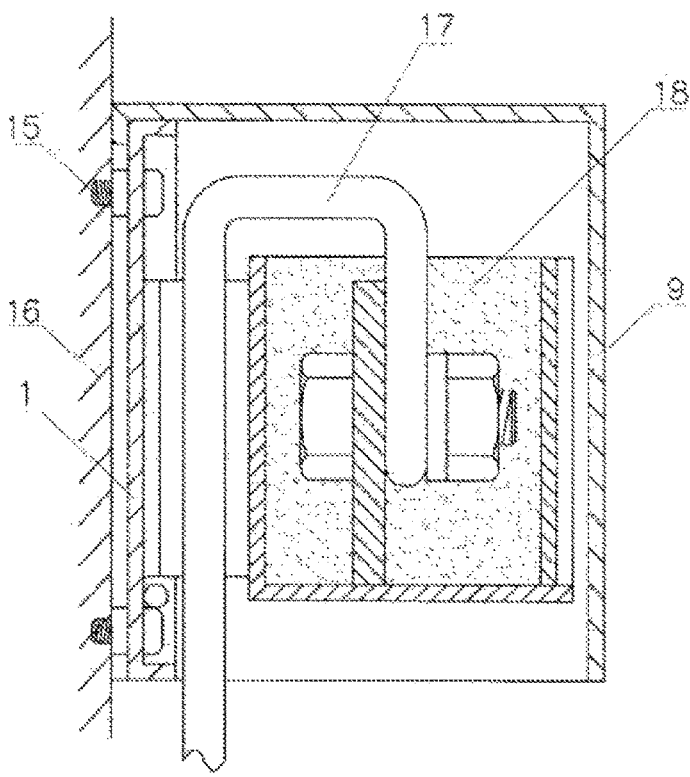
FIG. 4 is a reference cross sectional side view of the multipurpose wire connection device in use.

FIGS. 1 to 3 illustrate the structure of the first embodiment of the present disclosure. A multipurpose wire connection device includes a base plate (1), a conductive plate (3), wire fixation screws (5), a fireproof box (6), a support (11), and a shell (9). The based plate (1) has fixation holes (2). The base plate (1) includes a support (1) and base plate washers (14). The base plate (1) includes folded peripheries. The fireproof box (6) includes a piece of back plate, a bottom plate, two side plates, and an inserted plate (12). The fireproof box (6) is a box with an open top, wherein the box may be filled with fireproof materials. The back plate includes fixation holes for the fireproof box. Fixation screws (4) are used to affix the fireproof box (6) to the support (11). The side plates include receiving grooves (13) for receiving the inserted plate (12) and the shield plate (10) for allowing the conductive plate (3) to be affixed thereon. The conductive plate (3) includes holes for wire fixation screws and holes for affixing the conductive plate. The conductive plate (3) includes wire fixation screws (5), conductive plate fixation screws (7) affixing the conductive plate (3) to the shield plate (10). The housing (9) has a shape of a dustpan. The housing (9) uses fixation screws (8) to attach onto the base plate (1). FIG. 4 is a reference cross sectional side view of the multipurpose wire connection device in use. The method of use includes: first, affixing the base plate (1) onto a wall (16) of a piece or equipment or a building structure, and inserting a conductive wire (17) from below and behind the fireproof box (6). Then the conductive wire is bent down from the conductive plate (3) and the wire fixation screw (5) affixes the conductive wire onto the conductive plate. The insert plate (12) is then inserted into the receiving grooves (13). The fireproof box becomes a box with an open top. Fireproof materials are then deposited into the fireproof box. For example, the fireproof material may include silicon dioxide sand, ordinary sand, earth soil, or equivalents The housing (9) then covers the assembly and is secured with screws (8) at the folded peripheries of the base plate (1).

Embodiment 2

The multipurpose wire connection device based on the above description, further includes this feature: there is one or more of the wire fixation screw (5). This allows the wire connection device to receive one input and provides multiple output.

Embodiment 3

The multipurpose wire connection device based on the above description, further includes this feature: there is one or more of the fire proof box (6), conductive plate (3), and support (11). For example, the multipurpose wire connection device may be extended to include four units of what is shown in FIG. 1 (e.g., in the left or right direction). This extended example would enable multiple wires relay or division. In such example, the fireproof box may be separate or connected.

In some embodiments, the conductive plate (3) may be made of aluminum or copper or other conductive materials. The fireproof box (6) may be made of metal, plastic, or other nonconductive materials. The base plate (1) or the housing (9) may be made of zinc plated iron plates, stainless steel plates, aluminum, plastics, or other similar materials.

What is claimed is:

1. A multipurpose wire connection device comprising:
   a base plate, a conductive plate, a wire fixation screw, a fireproof box, a support, and a housing, wherein the base plate includes fixation holes, and support and base plate washers; the base plate has folded peripheries;
   wherein the fireproof box includes a piece of back plate, a bottom plate, two side plates, and an inserted plate; the fireproof box is a box with an open top; the back plate includes fixation holes for the fireproof box;
   wherein fixation screws are used to affix the fireproof box to the support;
   wherein the side plates include receiving grooves for receiving the inserted plate;
   wherein the conductive plate includes holes for wire fixation screws and holes for affixing the conductive plate;
   wherein the conductive plate includes wire fixation screws, conductive plate fixation screws affixing the conductive plate to a shield plate; and
   wherein the housing has a shape of a dustpan, the housing using fixation screws to attach onto the base plate.

2. The multipurpose wire connection device of claim 1, wherein there is one or more of the wire fixation screw.

3. The multipurpose wire connection device of claim 1, wherein there is one or more of the fireproof box, conductive plate, and support.

4. A multipurpose wire connection device, comprising:
   a base plate attached onto a fixation surface;
   a fireproof box affixed onto the base plate; wherein the fireproof box is filled with a fireproof material;
   a conductive plate affixed in the fireproof box and buried in the fireproof material, wherein the conductive plate carries a wire fixation screw affixing a conductive wire onto the conductive plate; and
   a housing covering the fireproof box.

5. The multipurpose wire connection device of claim 4, wherein the fireproof box is affixed onto the base plate via a support spacing the fireproof box from the base plate.

6. The multipurpose wire connection device of claim 5, wherein the conductive wire passes between the base plate and the fireproof box and is bent into the fireproof box.

7. The multipurpose wire connection device of claim 4, wherein the fireproof box further comprises a shield plate extending from side panels of the fireproof box to provide a fastening surface for affixing the conductive plate thereon.

8. The multipurpose wire connection device of claim 7, wherein each of the side panels of the fireproof box further comprises a receiving groove for receiving an end panel in forming the fireproof box.

9. The multipurpose wire connection device of claim 4, wherein the housing prevents rain, dust, or both, from entering the fireproof box.

10. The multipurpose wire connection device of claim 4, wherein the housing comprises an opening for the conductive wire to enter the multipurpose wire connection device.

11. The multipurpose wire connection device of claim 4, wherein the conductive plate carries additional wire fixation screws.

12. The multipurpose wire connection device of claim 4, further comprising additional fireproof boxes, each additional fireproof box having a corresponding conductive plate, for connections with additional conductive wires.

13. The multipurpose wire connection device of claim 4, wherein the fireproof material is silicon dioxide sand, ordinary sand, earth soil, or a mixture thereof.

14. The multipurpose wire connection device of claim 4, wherein the conductive plate is made of copper or aluminum.

* * * * *